(12) United States Patent
Bradley

(10) Patent No.: US 7,404,900 B2
(45) Date of Patent: Jul. 29, 2008

(54) AMMONIUM REMOVAL SYSTEM INCLUDING AN ELECTROPHYSICAL SEPARATION SYSTEM

(75) Inventor: Kirk D. Bradley, St. George, UT (US)

(73) Assignee: New Earth Systems, Inc., St. George, UT (US)

( * ) Notice: Subject to any disclaimer, the term of this patent is extended or adjusted under 35 U.S.C. 154(b) by 0 days.

(21) Appl. No.: 11/848,060

(22) Filed: Aug. 30, 2007

(65) Prior Publication Data

US 2007/0295666 A1    Dec. 27, 2007

Related U.S. Application Data

(62) Division of application No. 11/216,643, filed on Aug. 31, 2005, now Pat. No. 7,264,732, which is a division of application No. 10/389,414, filed on Mar. 14, 2003, now Pat. No. 6,960,301.

(60) Provisional application No. 60/364,806, filed on Mar. 15, 2002.

(51) Int. Cl.
*C02F 1/42* (2006.01)
(52) U.S. Cl. .................. 210/660; 210/663; 210/748; 210/760; 210/190
(58) Field of Classification Search ........... 210/663, 210/665, 669, 670, 703, 748, 760, 660, 190
See application file for complete search history.

(56) References Cited

U.S. PATENT DOCUMENTS

| | | | |
|---|---|---|---|
| 3,723,308 A | 3/1973 | Breck | |
| 3,842,000 A * | 10/1974 | Dawson | 210/668 |
| 3,929,600 A | 12/1975 | Hiasa et al. | |
| 3,969,245 A | 7/1976 | Ramirez | |
| 4,098,690 A | 7/1978 | Semmens | |
| 4,293,400 A | 10/1981 | Liggett | |
| 4,344,851 A | 8/1982 | Sherman et al. | |
| 4,522,727 A | 6/1985 | Weber | |
| 4,695,387 A | 9/1987 | Berry et al. | |
| 4,717,483 A | 1/1988 | Bush et al. | |
| 4,872,959 A | 10/1989 | Herbst et al. | |
| 5,082,813 A | 1/1992 | Taborsky | |
| 5,512,182 A | 4/1996 | Sheikh et al. | |
| 5,558,755 A | 9/1996 | Gardner-Clayson et al. | |
| 5,622,545 A | 4/1997 | Mazzei et al. | |
| 5,641,413 A | 6/1997 | Momont et al. | |
| 5,879,732 A | 3/1999 | Caracciolo, Jr. et al. | |
| 5,928,493 A | 7/1999 | Morkovsky et al. | |
| 6,054,058 A | 4/2000 | Joko et al. | |

(Continued)

OTHER PUBLICATIONS

Yang, Min, et al., "Study on By-Products of Oznoation during Ammonia Removal under the Existence of Bromide: Factors Affecting Formation and Removal of the By-Products," Ozone Science & Engineering 22, 23-29 (2000).

*Primary Examiner*—Robert A Hopkins
(74) *Attorney, Agent, or Firm*—Thorpe North & Western LLP

(57) ABSTRACT

An ammonium removal system includes an ion-exchange medium, a brine source, and an electrophysical separation system. The ion-exchange medium may be used to remove ammonium from a waste stream. A brine may be flushed through the ion-exchange medium to remove the ammonium from the ion-exchange medium. The ammonium containing brine may be treated using an electrophysical separation system.

14 Claims, 8 Drawing Sheets

U.S. PATENT DOCUMENTS

| | | |
|---|---|---|
| 6,080,314 A | 6/2000 | Rose |
| 6,080,319 A | 6/2000 | Alther |
| 6,207,059 B1 | 3/2001 | Moore, III |
| 6,294,061 B1 | 9/2001 | Morkovsky et al. |
| 6,346,197 B1 | 2/2002 | Stephenson et al. |
| 6,669,839 B2 | 12/2003 | Tipton et al. |
| 6,719,894 B2 | 4/2004 | Gavrel et al. |
| 6,902,678 B2 | 6/2005 | Tipton |
| 2004/0060876 A1 | 4/2004 | Tipton |
| 2006/0021942 A1 | 2/2006 | Bradley |

* cited by examiner

AMMONIUM REMOVAL SYSTEM INCLUDING AN ELECTROPHYSICAL SEPARATION SYSTEM

CROSS-REFERENCE TO RELATED PATENT APPLICATIONS

This application is a divisional of U.S. patent application Ser. No. 11/216,643, now U.S. Pat. No. 7,264,732, entitled "Continuous Ammonium Removal Systems," filed on 31 Aug. 2005, which is a divisional of U.S. Pat. No. 6,960,301, entitled "Leachate and Wastewater Remediation System," filed on 14 Mar. 2003, which claims priority to U.S. Prov. Pat. App. No. 60/364,806, entitled "Leachate and Wastewater Remediation System," filed 15 Mar. 2002, all of which are incorporated herein by reference in their entireties.

BACKGROUND

As the world's population grows and reserve supplies of clean water dwindle, the treatment of wastewater is becoming an increasingly important concern worldwide. Beginning in 1972 with the Clean Water Act, the United States substantially increased government regulations on wastewater treatment. These regulations along with aging water infrastructure, global population shifts, and the time pressures of existing treatment facilities further highlight the growing pressures on wastewater treatment industry.

Conventional wastewater treatment facilities employ a single or multi-stage process involving one or more of four main systems to remove the small amount of contamination contained in most wastewater. These systems include settling systems, biological systems, chemical treatment systems, and filtration/polishing systems.

Settling systems often comprise a primary treatment phase and involve the removal of solids suspended in wastewater. Such settling systems typically include settling ponds, primary classifiers, and the like. Larger solids are typically removed by screens, and smaller suspended solids by allowing them to settle to the bottom where they form sludge.

Biological treatment systems typically form a secondary phase of treatment, and are used primarily for the removal of organic materials. Typical biological treatment processes include facultative ponds, partially mixed lagoons, aerated lagoons, activated sludge, and the like. All of these systems employ microorganisms which remove harmful organics from the water. These microorganisms are contained in large ponds or lagoons where wastewater must sit for several days in order to allow sufficient time for the microorganisms to interact with and neutralize the contaminants contained in the water. Biological systems are highly effective and are used in approximately one third of all treatment systems worldwide. However, biological systems have certain limitations. For instance, if the microorganisms contained in the lagoons are shocked or killed by environmental changes or introduction of other agents, it can take weeks to produce a healthy colony of treatment bacteria. Furthermore, biological processes produce an enormous amount of toxic sludge (comprised largely of dead microorganisms and their waste products), which must be subsequently treated before disposal. Additionally, due to the large costs and time involved in constructing the facilities necessary for biological systems, they must be planned out well in advance of the anticipated need and may not respond to short term increases in the need for water treatment.

Various chemical treatment systems typically comprise a tertiary phase of wastewater treatment. These processes are designed to remove harmful bacteria from the wastewater, including any remnants of biological treatment processes. Additionally these processes are designed to remove dissolved contaminants contained in the wastewater stream. This phase can involve one or more of numerous processes including chlorination, ozonation, ion exchange or oxidation.

For most of the twentieth century, chlorination has been the most common method for removal of microorganisms from wastewater. While highly effective, chlorination has considerable drawbacks including the necessity of containing, transporting, and manipulating large quantities of potentially lethal chlorine. Frequently, the expense of maintaining appropriate chlorination facilities and training qualified personnel are cost prohibitive for smaller wastewater treatment facilities.

Another common chemical treatment method is the introduction of inorganic cationic coagulants such as aluminum salts and chlorides and sulfates of iron and calcium. Such treatments often create large amounts of residual sludge which must be disposed of. Further, chemical treatments are not well suited to influents of highly variable compositions.

The final phase of conventional wastewater treatment typically comprises polishing. During this phase the water is often filtered and treated depending on the particular wastestream so that any unwanted coloration or odor is removed. Following this phase, the water is typically ready for discharge into the environment, consumption, or other use.

SUMMARY

In view of the foregoing drawbacks to conventional wastewater treatment systems, a wastewater treatment system constructed and configured to be a turn key system, scalable to the needs of many situations, and capable of treating wastewater having low to high toxicity without the storage of hazardous chemicals continues to be sought.

It has been recognized that it would be advantageous to develop a wastewater treatment system which solves the aforementioned problems. The present invention provides an effective system for addressing many of the difficulties encountered in wastewater treatment.

The present invention encompasses a compact, portable, scalable, wastewater treatment system allowing for effective wastewater treatment meeting the immediate needs of any community, environmental, or industrial plan without extensive planning prior to implementation. This has been achieved through the creation of a wastewater treatment system that can comprise up to six primary phases which include: initial screening, an electro-physical separation, an advanced oxidation process, a fine filtration, ion exchange and a final disinfection step. The particular choice of process phases will depend on the properties of the waste-stream to be treated.

More specifically, in one potential embodiment of the present invention, these phases can include the step of removing large solids from a wastewater influent stream by passing the influent wastewater stream through a series of screens to create a primary, screened wastewater stream. The primary wastewater stream can then be directed to an electrocoagulation unit. A variety of electrocoagulation unit configurations can be used in the present invention in order to remove and flocculate a wide variety of contaminants. Dissolved, colloidal, and emulsified contaminants can be removed from the primary, screened wastewater stream by applying an electrical current to the electrocoagulation unit to induce precipitation and flocculation resulting in a secondary wastewater stream. An optional flocculant maturation unit can be included to allow for further formation of larger particulates._

Fine particulate matter and flocculants can then be removed by passing the secondary wastewater stream through one or more fine filters to create a wastewater stream contaminated substantially only by unfiltered organics. The organically contaminated wastewater stream can then be subjected to an advanced oxidation process to create a tertiary wastewater stream. The tertiary wastewater stream can then be contacted with zeolites, allowing an effective amount of reaction time with the zeolites to create a polished water stream. The polished water stream can then be exposed to ozone to create a final decontaminated or disinfected water stream. Periodically, under some conditions, the zeolites can be refreshed with a brine solution using a process which allows for continuous processing of wastewater streams.

Additional features and advantages of the invention will be apparent from the detailed description which follows, taken in conjunction with the accompanying drawings, which together illustrate, by way of example, features of the invention.

DRAWINGS

DETAILED DESCRIPTION

Figure 1:
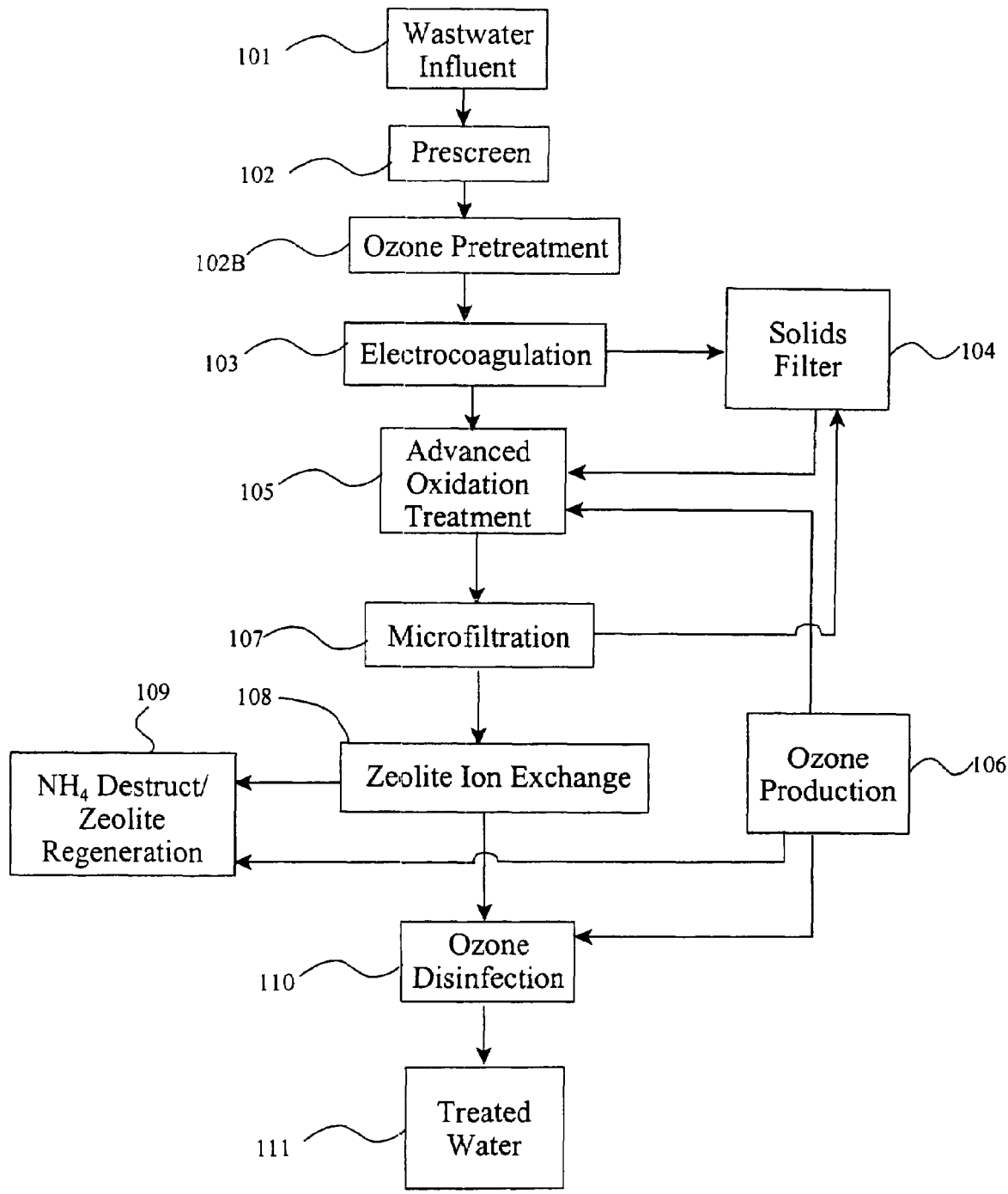
FIG. 1 is a flow diagram of the basic process of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The singular forms "a," "an," and "the" include the plural referents unless the context clearly dictates otherwise. Thus, for example, reference to "a heat source" includes reference to one or more such heat sources.

As used herein, "effective amount" refers to the minimal amount of a substance, agent, action, or time period to achieve a desired effect. For example, an effective amount of "cooling" is the minimum amount of heat loss required in order for a given substance to reach a desired stable temperature.

As used herein, "wastewater stream" or "water stream" refer to a body of water contained within the present invention, whether said body of water is in motion or not. Furthermore, "wastewater" and "contaminated water" are used interchangeably and include any body of water having undesirable components for a particular purpose. Thus, such wastewaters can include heavily contaminated mine and landfill leachates and also potable water needing minor clarification. The terms "formulation" and "composition" may be used interchangeably herein. The terms "fluid" and "solution" may be used interchangeably herein.

Concentrations, amounts and other numerical data may be expressed or presented herein in range format. It is to be understood that such a range is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

FIG. 1 illustrates a wastewater treatment process according to the present invention. At step 101, the wastewater to be treated is identified. Depending on the composition of the particular wastewater stream the following process can be modified to treat the water based on particular needs, i.e. potable versus non-potable uses. Further, some wastewater streams may not require some steps such as the prescreening, if such stream is devoid of substantial particulates. Any number of wastewater compositions can be treated in this process and the process of the present invention is highly effective at treating a wide variety of contaminated wastewater. The wastewater subjected to treatment can be industrial effluents, sewage, landfill leachate, acid mine effluents, mining or other commercial effluents, potable water source clarification, ground-water clarification, storm water treatment, mineral processing effluents, or any other contaminated body of water. The wastewater can contain a variety of contaminants such as, but not limited to, emulsified oils, hydrocarbons, dissolved particles, suspensions, undesirable minerals, bacteria, viruses, perchlorates, colorants, heavy metals, ammonium, toxic organics, chlorinated organics, pesticides, cyanide, arsenic, and a majority of other contaminants. The systems and methods of the present invention are capable of treating a variety of wastewater including those having extremely high levels of contaminants or merely as an additional disinfection and final polishing treatment.

Initial Screening

The contaminated water influent can be optionally subjected to an initial screening step 102 which removes large solids and particulates from the incoming water stream. This step may be unnecessary in the treatment of some influents, although clearly some care should be taken to prevent particulates from unnecessarily passing down stream. This step involves typical screening and filtration technologies and the choice of particular methods is within the skill of those in the art. Various screens, filters, classifiers, or centrifuges could be used. The primary function of this step is to remove larger solids, i.e. large debris, and particulates, i.e. those above about 100 μm, from the water stream. Further, the initial screening can include several steps such as a 0.5 inch bar screen followed by a gravimetric classifier or cyclone. Additionally, in order to provide continuous filtration of influents streams a variety of on-line/off-line cycles can be used. For example, in one embodiment of the present invention a plurality of filters are incorporated into a single unit. Influent is directed through several of these filters while one or more filters are cleared either by reversed fluid flow or other similar processes. The cycles of filtration and clearing can be controlled by computer driven valves or manually.

Ozone Pretreatment

Following the initial screening 102 step, an optional ozone pretreatment step 102B can be performed. Depending on the level of contaminants of the influent waste-stream a pretreatment of between about 1 and about 2 ppm of ozone can be added. The ozone can be added in either a tank or along a mixing pipe as described in more detail below.

Electro-Physical

Following this screening and filtration process or optional ozone pretreatment, step 103 includes an electro-physical process which removes dissolved particles, emulsified oils, colloidal material and minerals suspended in the water. This electro-physical process results in the removal of a vast majority of the contaminants. This process is highly effective at killing bacteria and viruses, and is effective in removing the majority of contaminants such as, but not limited to, arsenic, aluminum, barium, biochemical oxygen demand (BOD), cadmium, calcium, chromium, coliform, colorants, copper, cyanide, oils, iron, lead, magnesium, manganese, mercury, molybdenum, nickel, pesticides, phosphates, silicon, sulphates, total suspended solids (TSS), silver, vanadium, volatile organic solids, and zinc.

Arsenic removal is particularly significant because new regulations on arsenic removal require municipalities to remove more arsenic from treated drinking water. Requirements have become more stringent from previously allowing 50 parts per billion to only 10 parts per billion of arsenic in treated drinking water by 2006. The improved electro-physical and ion exchange processes of the present invention meet these requirements.

The electro-physical process involves electrocoagulation, which is the process of destabilizing suspended, emulsified or dissolved contaminants in an aqueous medium by introducing an electrical current into the contaminated wastewater. The electrical current provides the electromotive force to drive the chemical reactions to a new equilibrium. When reactions are driven or forced, the elements or compounds will approach a new stable state. Generally, this state of stability produces a solid that is either less colloidal and less emulsified or soluble than the compound at the original equilibrium values. As this occurs, the contaminants form hydrophobic entities that precipitate and can easily be removed by a number of secondary separation techniques. Thus, this process is often referred to as electrocoagulation. In addition to changing equilibrium, application of an electrical current also causes hydrolysis of a portion of the wastewater. This hydrolysis releases hydrogen and oxygen gas into the wastewater to form hydroxyl ions. The hydroxyl ions react with metals and other contaminants which then precipitates out and the oxygen acts as a moderate oxidizer of other contaminants.

Figure 2:
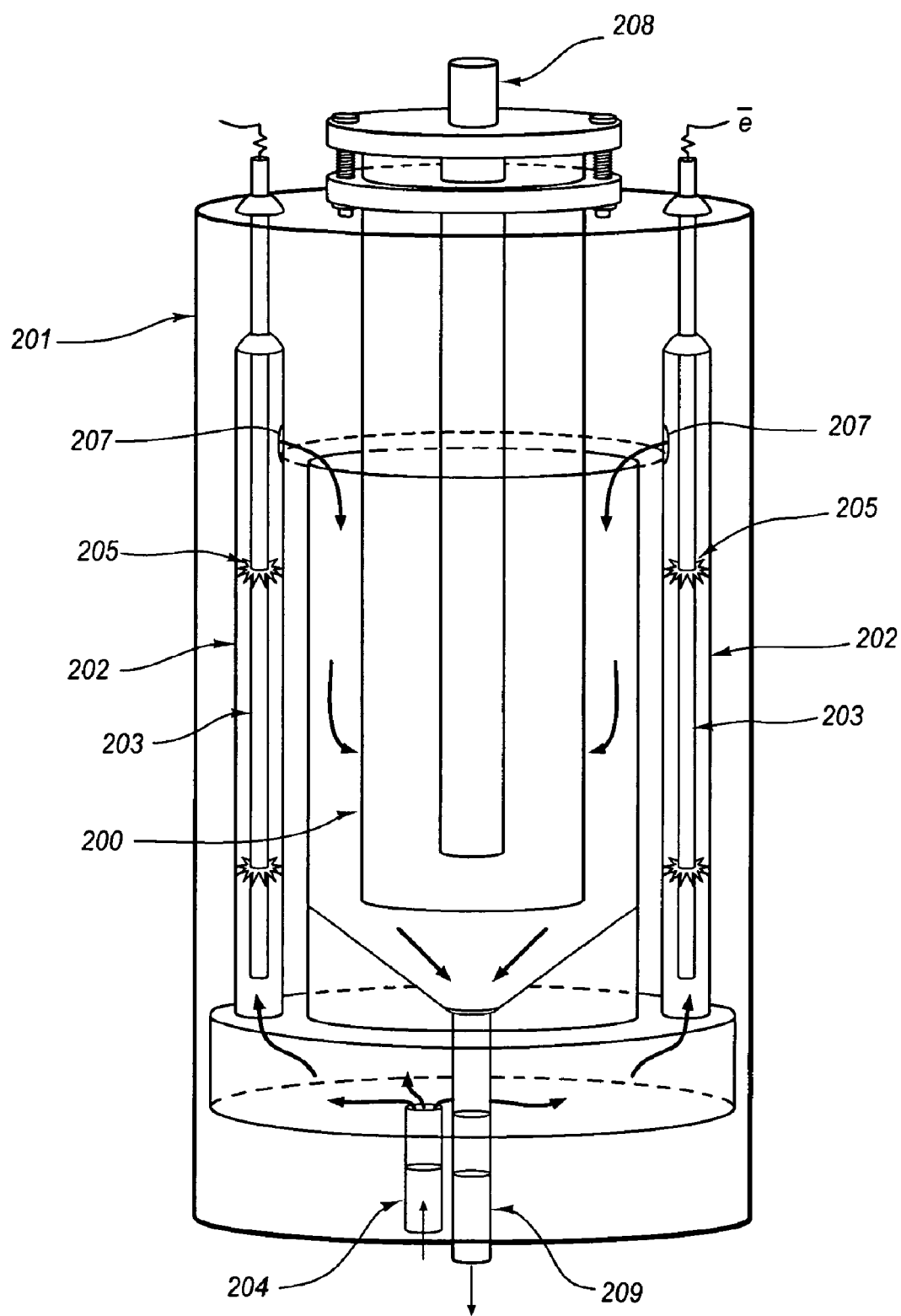
FIG. 2 is a schematic view of an embodiment of the electrocoagulation module.

The actual application of electrical current to the wastewater stream can be provided in a number of ways such as parallel conducting plates or an annular configuration. The particular electrocoagulation unit can be configured in a variety of ways and yet achieve good results. FIG. 2 depicts one embodiment of the electrocoagulation unit 201 in accordance with the present invention which is effective. A plurality of tubes 202 are provided each having an electrode 203 placed in the center thereof which extends a majority of the length of the tube. The wastewater is delivered to one end of the tube via inlet 204 and travels the length of the tube and exits the tube at outlets 207. Non-conducting spacers 205, such as nylon or other polymer, can be used to prevent contact between the electrode and the inner surface of the tube. The size of the outlets 207 and the spacers 205 should be chosen to prevent agglomeration or clogging. Typically a spacing of about 1/8" has proven adequate although other spacing distances can also be successfully utilized.

A voltage is applied to the electrode to produce a voltage across the space between the electrode and the inner surface of the tube. The voltage across this space should be sufficient to cause electrocoagulation of a substantial portion of the contaminants. A DC voltage of about 5 to about 6 volts and about 700 A across this space at a flow rate of about 0.1 gpm per tube has provided good results, although between about 2V and about 15V would suffice for most treatments using an electrocoagulation unit as shown in FIG. 2 and having 72 electrodes. Of course, different voltages would be required by various configurations which can be determined by those skilled in the art. In order to further improve the electrocoagulation process results a pulsed current and/or periodic reversal of polarity can be applied to the electrodes. These variations of current enhance the destruction of bacterial and other cell membranes, increase flocculation, and reduce scale buildup on the anodes.

In the embodiment shown in FIG. 2, these tubes are arranged in an array of tubes placed parallel to one another side-by-side in a generally circular configuration. Notice that only two such tubes are illustrated for clarity, however a variety of arrangements would satisfy the requirements of the present invention. Thus, for example consecutively annular tubes each acting alternately as an anode or a cathode is another possible configuration. Another possible configuration includes spiralized cathode and anode plates which are interwoven without contact such that fluid flows between the coiled plates from the center toward to outer diameter along a spiral path as disclosed in patent application 60/453,535, filed Mar. 10, 2003, entitled Electrocoagulation System and Method of Use, which is hereby incorporated by reference in its entirety. The tubes and electrodes are constructed of various metals that are selected to optimize the removal process. The most common materials are iron, aluminum and their alloys although other materials which provide ions could be used such as steel, platinum, carbon, magnesium, conductive ceramics and plastics, titanium and other ferrous alloys. In accordance with Faraday's Law, metal ions will split off or be sacrificed into the liquid medium; these metal ions tend to form metal oxides that electro-mechanically attract to the contaminants that have been destabilized. These electrodes, if sacrificial, will eventually require replacement or cleaning.

Referring again to FIG. 2, in this configuration a filter 206 is placed in the center of the array of tubes and is designed to remove the coagulated contaminants from the liquid. The filter can be any filter which is capable of removing particulates which are about 1 to 5 μm and larger. The filter shown in FIG. 2 is a cylindrical filter where the liquid from the tube outlets 207 is drawn through the filter to outlet 208 at the top of the electrocoagulation unit. Notice that the inlet end of the tubes are lower than the outlet ends. Although not required, this configuration improves the contact of particulates and fluid past the filter surface. Various factors influence the rate of electrocoagulation such as: residence time of the wastewater, applied current and voltage, turbulent flow characteristics, temperature, electrode surface area, and concentration of contaminants in the wastewater.

In a more detailed aspect of the present invention, in order to prevent excessive build-up of filtered particulates on the outer surface of the filter 206 various methods can be used to continuously or periodically remove the particulates. These methods include but are not limited to, air pulses, shaking, physical cleaning, or other known methods. In one embodiment of the present invention sixty nozzles placed in the center of the filter provide the necessary removal. For example, 40 psi air can be provided at a pulse rate of 1 pulse per second to obtain adequate results. The removal process can be performed periodically based on the performance of the filter. During this removal process, the unit is typically shutdown by closing valves 208 and 204 and opening valve 209. Pressure is then applied to the air nozzles to dislodge particulates which are then forced out of the unit via line 209. This removal process is preferably computer controlled at regular intervals but can also be manually performed.

The particular configuration of the electrocoagulation unit described also provides for increased turbulence in the wastewater flow therethrough. It is known that turbulent conditions improve the life of the electrodes by minimizing electrode deposition, erosion, and fouling and improves conductivity through the wastewater medium.

The coagulated solids are then removed as a slurry from the unit via outlet 209 and the substantially purified water is removed via outlet 208 once 209 is closed. Electrocoagulation produces significantly less residual solids than conventional chemical treatments. Typically, about 0.2 lb of metal per 1000 gallons of treated water is sacrificed from the anode to flocculate with contaminants but varies widely depending on the incoming stream.

Although, the above electrocoagulation unit has been described in detail, other configurations and modifications which would occur to one skilled in the art are deemed within the scope of the present invention.

Tests have shown that the above contaminants are removed at over about 90%, and predominantly over 95% for each contaminant listed except ammonium, mercury, and molybdenum. Table 1 shows the results of a typical treatment according to this step of the present invention.

TABLE 1

Electrocoagulation Results

| Contaminant | Percent Removed |
| --- | --- |
| Aluminum | 99+ |
| Ammonium | 60 |
| Arsenic | 94 |
| Bacteria | 98 |
| Barium | 98 |
| BOD | 97 |
| Cadmium | 98 |
| Calcium | 96 |
| Chromium | 99+ |
| Total Coliform | 99+ |
| Color Removal | 99+ |
| Copper | 99+ |
| Cyanide | 90 |
| Oils | 94 |
| Iron | 97 |
| Lead | 95 |
| Magnesium | 98 |
| Manganese | 96 |
| Mercury | 65 |
| Molybdenum | 80 |
| Nickel | 99 |
| Pesticides | 98 |
| Phosphates | 97 |
| Silicon | 98 |
| TSS | 98 |
| Silver | 99+ |
| Vanadium | 95 |
| Volatile Solids | 97 |
| Zinc | 99+ |

Liquid/Solid Separation

Figure 3:
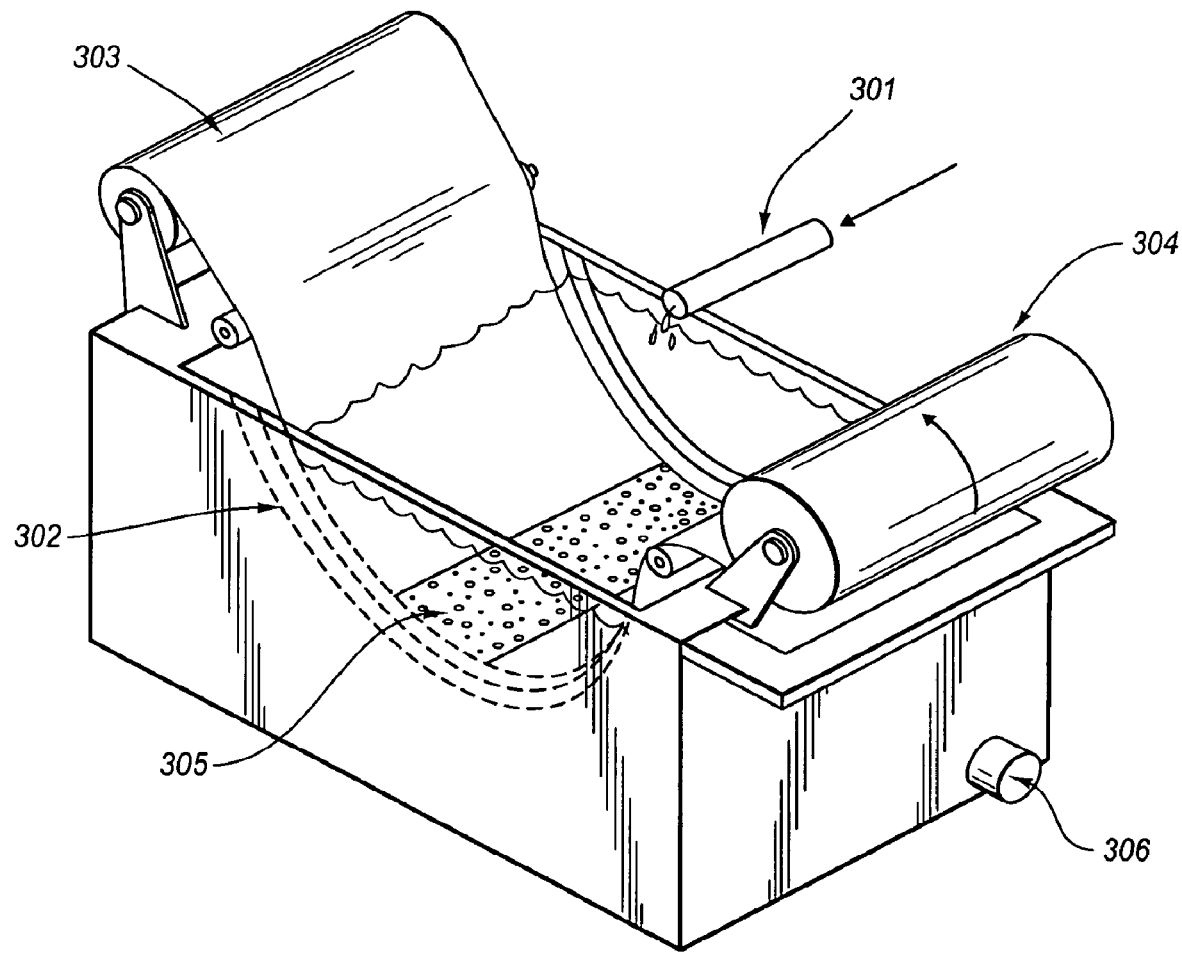
FIG. 3 is a schematic view of the solids dewatering unit in accordance with the present invention.

As shown in FIG. 1, after electro-physical treatment step 103 the resulting solids are delivered to a solids treatment step 104. During this step the solids slurry recovered from step 103 is separated and the water is sent back to the process for further treatment (either step 103 or the following step 105, discussed below). Although a number of filtering devices could be used and are considered within the scope of the present invention, FIG. 3 shows one particularly effective embodiment. In this embodiment, the solids slurry is delivered via inlet 301 to a generally drum or v-shaped shaped container 302. A filter cloth 303 is provided at one end of the unit which follows the contour of the container bottom and is drawn up the other side and collected at roll 304. In one aspect, a direct pressure member (not shown) is used to guide the cloth and force it against filter 305. As the cloth is advanced the direct pressure member can be displaced slightly to allow free movement of the filter cloth. The water is drawn through filter 305 by pulling a low pressure on the underside of the filter to create a pressure differential. As the filter cloth becomes saturated with particulates it is replaced. This is most often accomplished by moving the filter cloth across the filter at a constant rate while maintaining the pressure differential. For example, a 45 lb weight geotextile filter cloth having 150 to 210 µm pores can be drawn at a rate of between about 150 and 900 gall/yd2. This rate may vary widely depending on the particular wastewater stream and is adjusted based on experience. The filtered water is then removed from the unit via line 306. Most often this water is of sufficient clarity to send to the advanced oxidation process step 105 discussed below. These units have a space saving configuration that ensures the maximum filtration power is generated within a small footprint.

Advanced Oxidation Process

Following the electrocoagulation step 103 the water is then treated in an advanced oxidation process (AOP) at step 105. An oxidizer, such as ozone, fluorine, hydrogen peroxide, potassium permanganate, hypobromous acid, hypochlorous acid, chlorine, or mixtures thereof, is forced through the water in high concentrations. As an optional enhancement, an electrical variable or pulsed current from a non-sacrificial anode is driven through the water to be treated. The current causes the formation of hydroxide ions which in combination with the oxidizer interacts with the water, reducing remaining impurities such as hydrogen sulfide, iron, algae, fungus, mold, yeast, bacteria, virus and ammonium. Although other oxidizers could be used ozone provides excellent results and is readily produced on-site. In an alternative embodiment other agents can be added during the oxidation process such as air and/or ultraviolet light. It is important to note that the advanced oxidation process utilizes significantly higher concentrations of ozone than is typically used for disinfection processes. Specifically, a remediatively effective amount of oxidizing agent is added to the water. In the present invention, ozone is used at an earlier stage and in higher concentrations which are sufficient to fully saturate the solution and are generally from about 2 to about 5 times higher than is used in typical ozone disinfection process ozone concentrations. The exact concentrations necessary for a remediatively effective amount will vary depending on the waste stream. As a general guideline, however, ozone disinfection processes use from 2 to as high as 30 ppm, but are typically about 5 ppm. The process of the present invention utilizes ozone concentrations which are about 2 to about 5 times greater than would be used in standard polishing ozone disinfection processes. Thus, a remediatively effective amount can be as low as about 4 ppm to as high as about 200 ppm. In addition, the solubility of ozone in solution depends on a variety of factors such as temperature, pressure, and other components in solution. Of course concentrations outside this range can be used depending on the nature of the influent wastewater. During the advanced oxidation process pressures of between about 20 psi and about 60 psi can be used. This advanced oxidation process step can remove BOD, chemical oxygen demand (COD), residual precipitatable components, and other contaminants. Removing a substantial portion of these types of contaminants at this phase in the process helps to reduce the load and the rate of depletion of the ion-exchange columns described below.

In one embodiment of the present invention, static pipe mixers (described below in conjunction with FIG. 8) are utilized which allow for thorough mixing of the ozone and waste-stream and improved reaction and residence times.

Ozone is a particularly desirable oxidizer, not only for the strong oxidizing properties, but also for the ease of production and availability. At step 106 ozone is produced from air using any number of known technologies. For example, in one process, air is collected and the oxygen content is increased using commercially available oxygen concentrators. The oxygen is then subjected to electric exhalation at between about 10 and 20 kV to produce ozone. Ozone produced in this manner merely requires air, electricity and a cooling medium such as water or air. The ozone produced from this step can be used throughout the process. Typical commercial ozone units produce ozone at a low pressure. As a result, the steps of the present invention which utilize ozone are typically below a pressure of about 10 psi.

Microfiltration

After the AOP step an optional microfiltration step 107 can be performed to further clarify the partially treated wastewater. This step removes particles which are about 1 µm or larger using standard filters known to those skilled in the art.

Ion Exchange

Following the AOP step 105 (or optional microfiltration step 107), the partially treated wastewater is further treated in ion-exchange step 108 to remove residual dissolved ions such as ammonium. Natural or synthetic zeolites can be used to conduct ion exchange and remove the ammonium from the water as it passes through the zeolite chambers. However, it will be appreciated that materials such as clays, clay-like minerals, expandable clays, ferrous sulfate impregnated ceramics, chabazite, carbon, or any other material which act as an ion exchange medium with ammonium can also be used in connection with the present invention. These can include natural or synthetic materials. For instance, both naturally occurring zeolites and artificially synthesised zeolites have been investigated for use as the mineral substrate of the present invention. Zeolites (hydrated aluminosilicates) are a moderate to high cation exchange capacity material and although they are aluminosilicate minerals like clays, they have a various three dimensional framework structure with internal cavities characterized by high surface areas. The zeolite structure acts as a molecular sieve to remove ammonium and other cations from the contacted solution. Types of zeolites include: clinoptilolite, chabazite, phillipsite and mixtures thereof. Because natural sources of zeolites often contain mixtures of zeolites instead of one single zeolite and some zeolites share several common characteristics. Therefore, the term "zeolite", as used herein, will refer to one zeolite and also to a mixture of zeolites with the desired properties.

Selected zeolites enable ammonium ion and various metal ions to be separated from wastewaters, as disclosed by Weber in U.S. Pat. No. 4,522,727, for example. Preferential zeolitic separation of ammonium (plus heavy metals) from alkali metal ions in solution is taught by Hagiwara and Uchida, using a modified mordenite in "Ion-Exchange Reactions of Processed Zeolite and Its Applications to the Removal of Ammonia-Nitrogen in Wastes" (at pp. 463-470) in Natural Zeolites, etc., International Conference 1976, published by Pergamon in 1978. Breck in U.S. Pat. No. 3,723,308 characterizes an artificial zeolite (F) as useful to remove ammonium without removing so much alkali or alkaline earth metals as can occur with natural zeolites.

Figure 4:
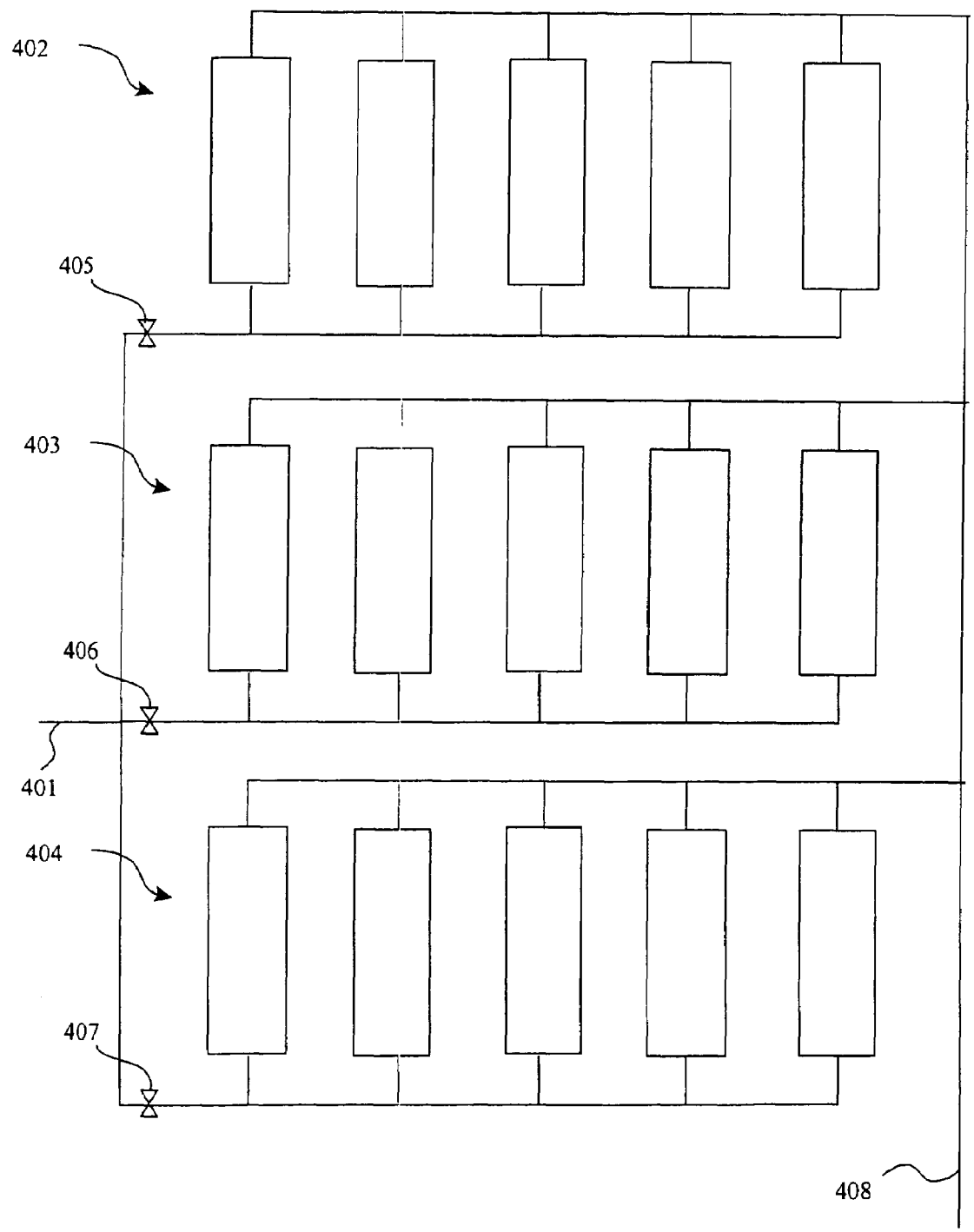
FIG. 4 is a schematic view of the ion-exchange columns in accordance with the present invention.

In step 108 the wastewater is processed through a system of ion-exchange columns. Wastewater from either steps 105 and/or 107 enters the ion-exchange process via line 401 shown in FIG. 4. In the embodiment shown in FIG. 4, a system of three sets of columns 402, 403 and 404 are shown. Although not required, these columns are typically packed bed columns configured such that the inlet is at the bottom of the column and the outlet is at the top of the column to prevent channeling. The water is then removed via line 408 and sent to the next step of the process 110 described below. Optional screens and/or zeolites having a variety of mesh sizes can be placed within the column. The screens would preferably be a finer mesh toward the center of the columns and coarser mesh toward the ends. In addition, it is often beneficial to include larger zeolite particles toward the ends of the columns and finer zeolite particles toward the center in order to reduce the possibility of smaller zeolite particles from escaping the columns.

The wastewater to be treated is sent to one or more of the sets of columns. Periodically, fluid can be sent through the columns in a reverse path in order to dislodge particulates which may have accumulated at the screens or throughout the column. Additionally, as the zeolite, or other ion-exchange medium, is used the efficiency begins to decrease as the available pores within the zeolite structure are occupied. Monitoring of the column performance will indicate when each column or set of columns has been saturated. In order to provide continuous operation, the saturated columns are periodically taken off-line to remove the ammonium in a regeneration step and a recently regenerated column is brought on-line such that there is no interruption in the overall production of treated water. Thus, for example columns 402 ands 403 would be online while columns 404 were being regenerated, wherein valves 405, 406 and 407 would control which sets of columns were online at any given time. The online sets of columns can be operated either in series or in parallel. When the online sets of columns are operated in series it is preferable, although not required, that the most recently regenerated column is second so that the water stream is polished with a fresher column.

Regeneration of the columns is accomplished by flushing the column with a brine solution, wherein sodium or like molecules displace the ammonium which is then removed from the zeolite column. The concentration of sodium or other cation must be sufficient to drive substantially all of the ammonium from the ion-exchange material. Typically, rinsing with the brine solution for no less than about 4 to 10 bed, i.e. column, volumes is sufficient to regenerate substantially all of the zeolite of the column. The brine solution is typically about 2% to about 5% minimum concentration. This process allows each ion-exchange column to cycle through a series of online ammonium removal and offline ammonium destruction, zeolite replenishment cycles.

Once the ammonium is removed from the columns it is treated in step 109 in an ammonium destruct process. The following is a discussion of this process. An effective amount of bromine is added (typically in the form of sodium bromide) to the brine solution removed from the columns to aid in the ammonium destruct process. The following reaction sequences illustrate the known effect of bromine as a catalyst on such a process using ozone.

Reaction with Bromine

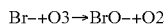

BrO−+2O3→BrO3−+2O2BrO−+H3O ↔ HBrO+H2O

HBrO+NH3→NH2Br++H2O

NH2Br+3O3→2H2O→NO3−+Br−+3O2

Reaction without Bromine

NH3+4O3→NO3−+4O2+H3O+

(Occurs very slowly below pH of 9.3)

The resulting solution is a brine solution which can then be reused to again regenerate the ion-exchange columns. In an alternative embodiment a second electrocoagulation unit can be operated on the ammonium containing effluent prior to the above chemical treatment.

Figure 5:
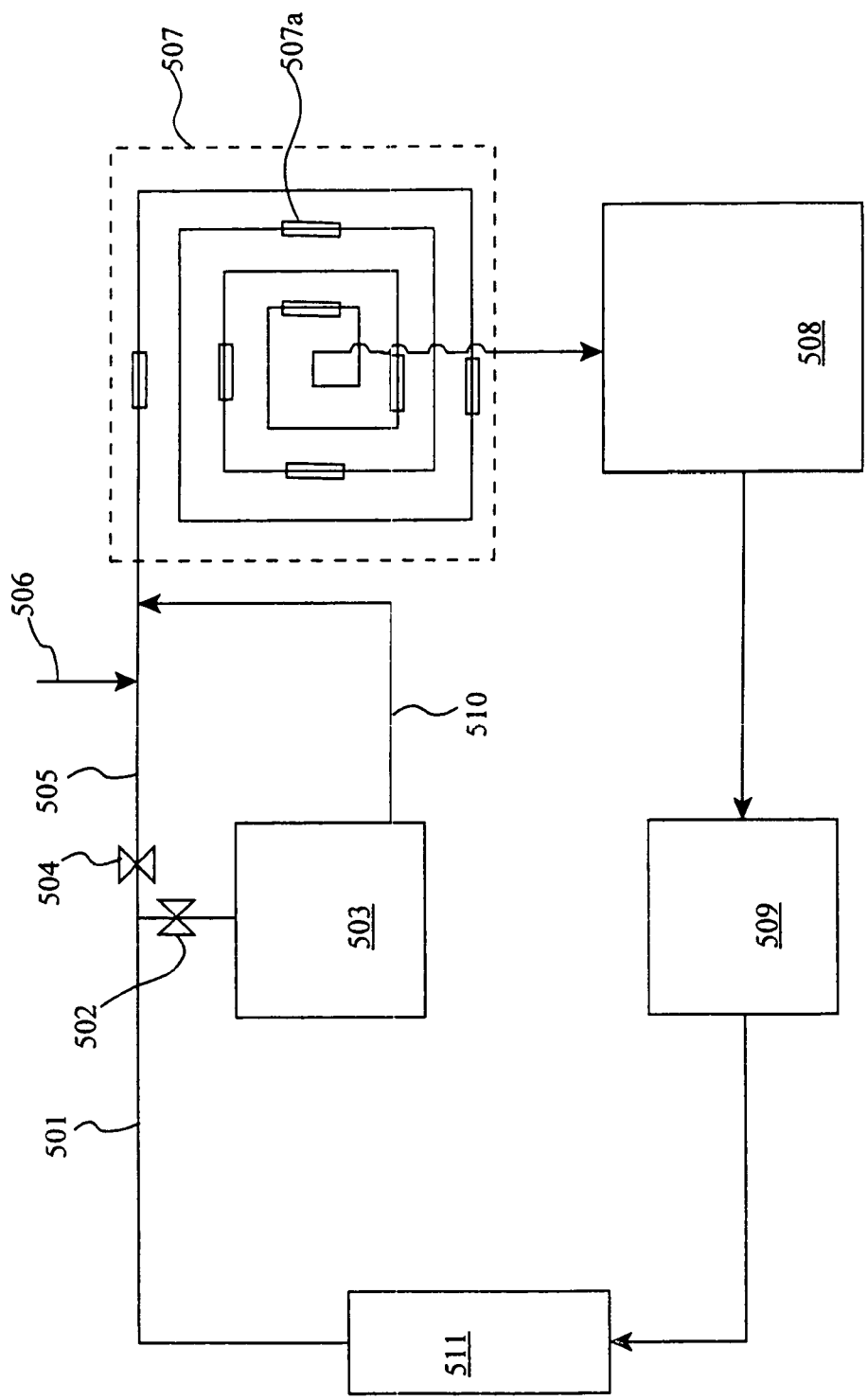
FIG. 5 is a schematic view of an ammonium destruct unit in accordance with the present invention.
Figure 6:
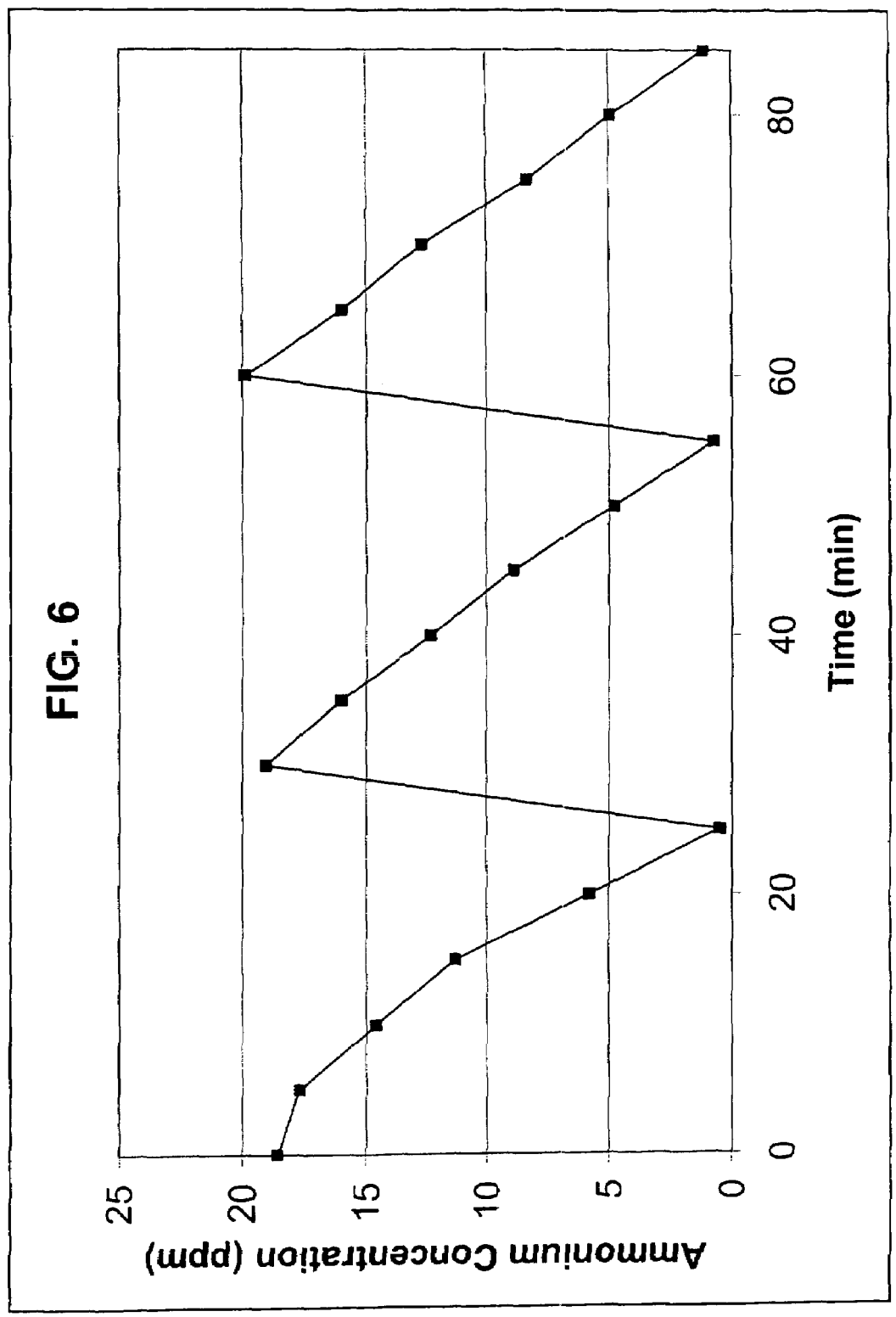
FIG. 6 is a graph showing ammonium destruct rate in the ammonium destruct process.

Referring now to FIG. 5, the ammonium-rich brine solution removed from the zeolite columns 511 which are in the process of regeneration is directed via line 501 to the ammonium destruct step process 109. The ammonium-rich brine solution recovered from the columns varies in ammonium concentration over time. Specifically, the initial volumes of brine solution contain a majority of the ammonium. For example, the first few bed volume may contain as much as about 85% of the total removed ammonium. FIG. 6 shows a typical ammonium concentration curve showing the ammonium destruct rate in a solution having ammonium introduced at the point where ammonium concentrations reach a specified minimum. It should be noted that the rates shown in FIG. 6 are only representative as rates as much as 20% greater have been achieved under some conditions. Further, it has been found that segregating the initial brine solution having a high ammonium concentration from later lower concentration solutions improves the ammonium removal rate from the zeolite columns and ammonium destruct process. Thus, as shown in FIG. 5, incoming ammonium-rich brine is fed along line 501 initially through valve 502 and into tank 503. Once the ammonium concentration is below the desired range, valve 502 is closed and valve 504 is opened to permit flow via line 505. Ozone is then injected via line 506 and the ammonium-containing brine is sent to reactor 507. In one detailed aspect, the ozone stream in line 506 and/or the brine can be cooled in order to increase the ozone concentration of the solution.

Although other configurations can be effectively used, one current embodiment utilizes a reactor 507 which is a pipe reactor containing a plurality of spaced apart in-line static mixer pipes 507a, described in more detail below in conjunction with FIG. 8. As the solution flows through reactor 507 a substantial portion of the ammonium is destroyed at the rate shown in FIG. 6. The solution can then be sent to a holding tank 508, shown in FIG. 5, where the remaining ammonium is converted leaving a solution which is largely void of ammonium and suitable for reuse as the brine solution. The solution can then be sent to a second tank 509 for reuse in regenerating zeolite columns 511. Over time the solution becomes saturated with ozone. Periodically, or on a gradual continuous basis, a portion of the ozone is released from solution by an optional degas valve, preferably placed between the reactor 507 and the holding tank 508. Alternatively, a set of reactor 507 and holding tank 508 systems can be used alternately. Thus, as one system is off-line the ozone is allowed to separate into the open space in the tank thus reducing the ozone concentration of the solution.

Figure 7:
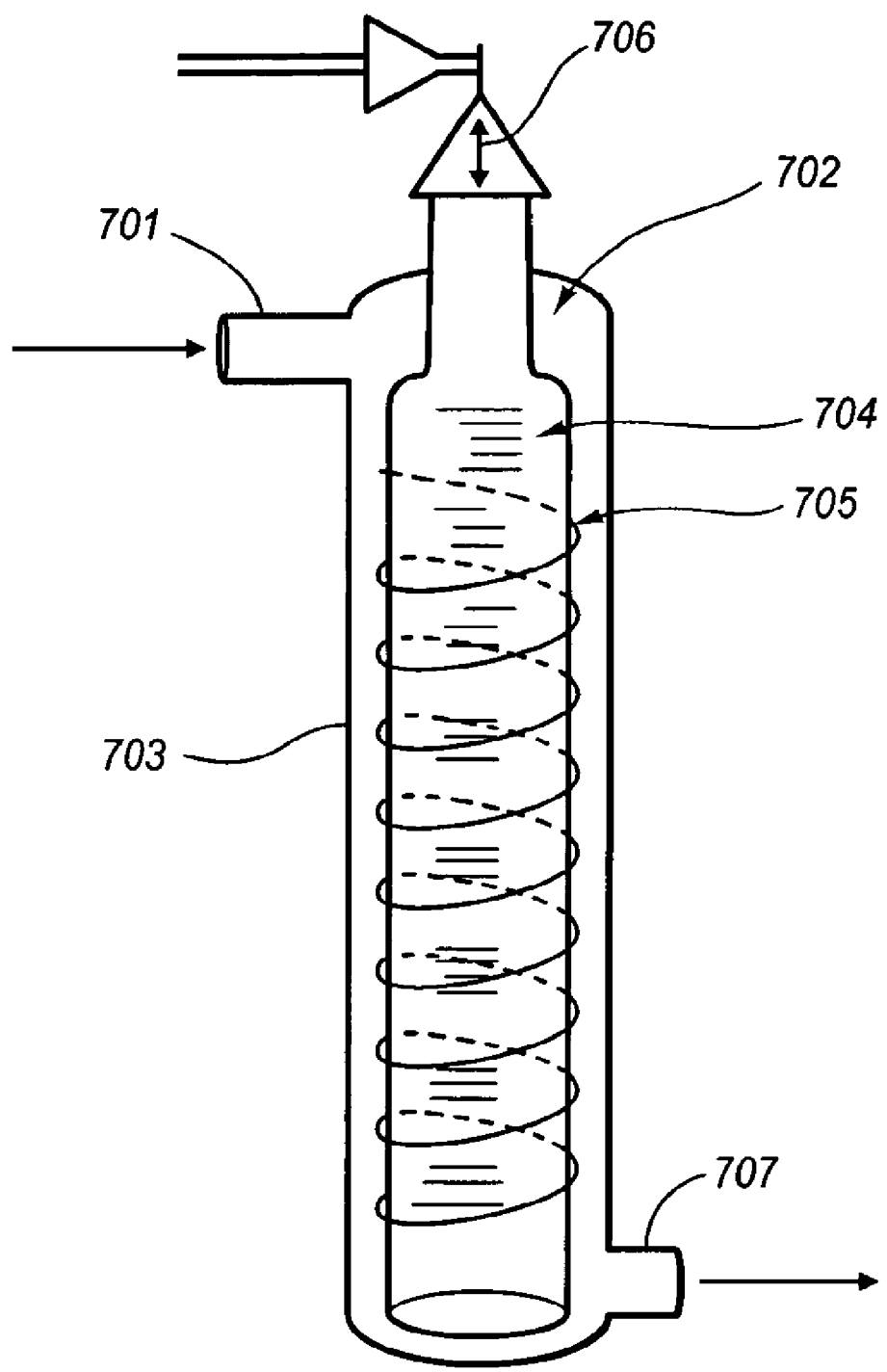
FIG. 7 is a perspective view of one embodiment of a degassing unit in accordance with the present invention.

Although a variety of degas valves can be used, FIG. 7 illustrates one currently developed configuration. Ozone saturated solution is received via line 701 into a unit having a typical hydrocyclone feed manifold 702. The unit has an outer cylindrical housing 703 and an inner cylindrical pipe 704. The ozone saturated solution flows in a spiral vortex through the annular space between 703 and 704. The inner pipe 704 can include a plurality of slits which allow the ozone to escape toward a typical degas valve 706. The ozone can then be recirculated for use in other parts of the system or sent to the ozone destruct process. In order to improve mixing and ozone separation a flow directioning member 705 can be added in the annular space. FIG. 7 shows a tube which is wrapped around the inner pipe to cause circular flow of the solution as it moves toward the bottom outlet 707. The flow directioning member 705 can be any obstruction which directs the flow such as a tube, flange, baffling, or other similar members. It should be noted that using a typical degas valve alone generally allows for excess ozone to be released which increases the required ozone. This is undesirable as the ozone concentration should be merely reduced slightly rather than completely vented.

Referring again to FIG. 5, the concentrated ammonium-rich brine held in tank 503 can be slowly introduced into the reactor 507 via line 510 either before or after the ozone injection point. By monitoring the ammonium concentration at various points the flow rate of ozone, concentrated ammonium-rich brine, and other flow rates can be adjusted as necessary. Various additional configurations can also be utilized to improve the efficiency and rate of the ammonium destruct process. In one aspect of the present invention, a second reactor 507 and holding tank 508 combination can be operatively connected to the first reactor and holding tank set such that the ozone and ammonium-containing water can be cycled between the two systems until the desired ammonium levels are reached. In order to maximize the recovery of ammonium from the zeolite columns during the regeneration cycles, brine solutions having insignificant concentrations of ammonium are preferably used to regenerate the columns.

In addition, as the brine solution is cycled through the zeolite regeneration and ammonium destruct processes it is heated by warm ozone and pressure changes. The increase in temperature reduces the solubility of ozone in the solution and thus the ammonium destruct rates. Thus, it is beneficial to cool the brine solution using any number of known cooling processes such as heat exchangers or the like. In one embodiment, the ozone saturated brine solution can be sent through a baffled tank which acts as a compact heat exchanger.

In one detailed aspect of the present invention, electrocoagulation can be optionally performed in conjunction with the ammonium destruct process. Such treatment can be performed either just before injection of ozone or at a later stage. Such additional electrocoagulation treatment has proven to further enhance contaminant removal and the ammonium destruct rates.

Figure 8:
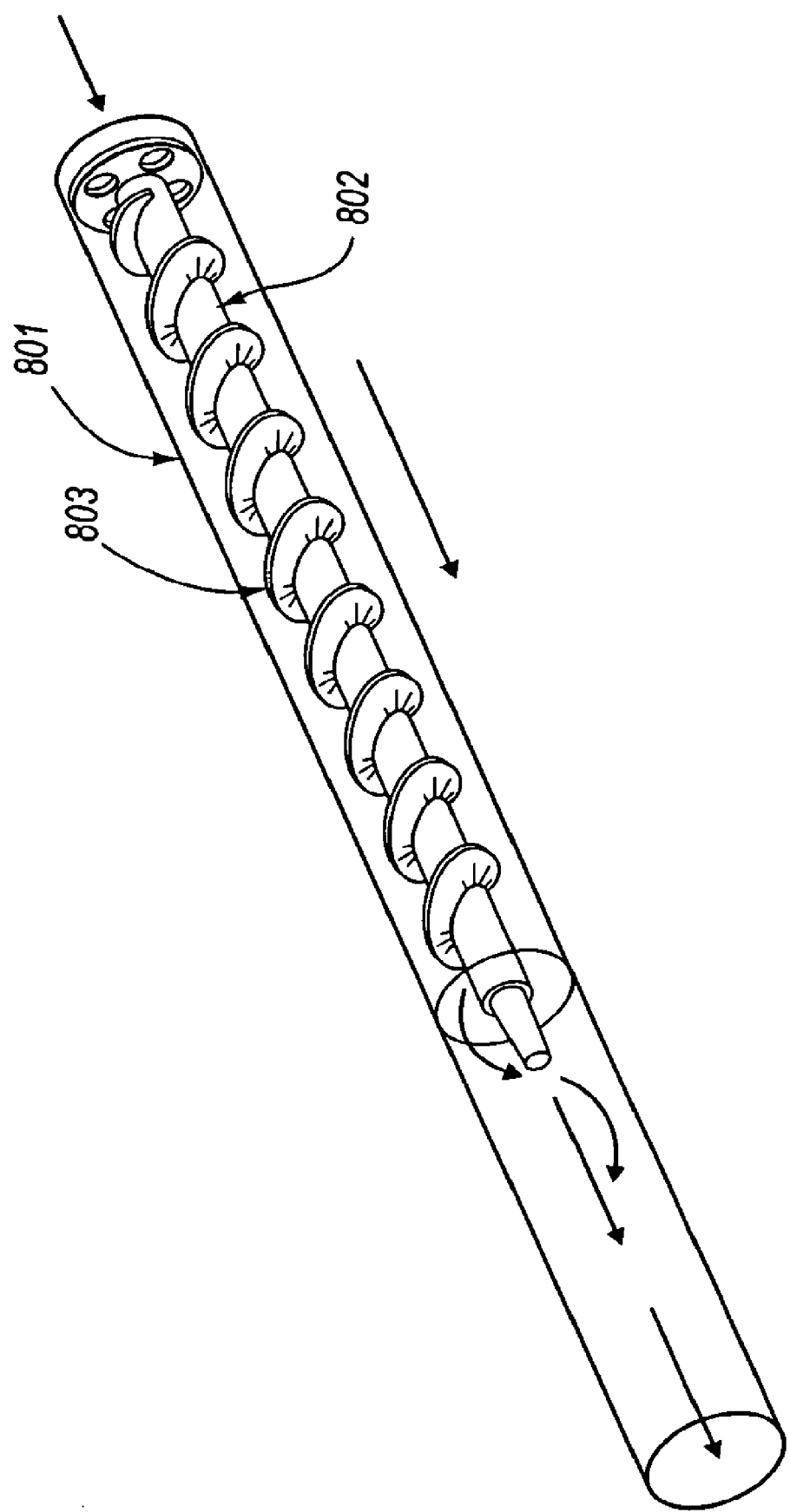
FIG. 8 is a cut away view of a unique static mixer pipe for use in the present invention.

The ammonium destruct process can be efficiently enhanced using static mixer pipes such as that shown in FIG. 8. Two concentric pipes 801 and 802 having an annular space between them is provided. A portion of fluid is passed through the center pipe 802 to decrease the pressure change upon entry of the mixer and to improve exit mixing by providing at least two flow paths of substantial volume. A flexible tube 803 is wrapped around the outside of the inner tube 802 to cause spiral motion of the fluid which is directed through this annular space. Other flow directing member can be utilized besides a flexible tube such as solid flanges, baffles, or the like. Such flow directing members can be attached to either the inner or outer pipes or both as long as a substantial portion of the flow therethrough is directed in a spiral motion along the length of the pipe mixer. In addition, this flexible tube or other flow directing member can contain a plurality of microslits which allow for introduction of a liquid and/or gas, such as ozone, air, polymers, etc, to the fluid. One advantage to using a flexible polymeric tube is that upon application of pressure the slits will open allowing the gas and/or liquid to enter the annular space and upon reduction of pressure the slits will return to a closed position thus controlling the amount of gas and/or liquid and preventing backflow of the same. As the fluid exits this mixer the components are further mixed without the use of additional energy. This configuration allows for mixing without the requirement of extra pump or energy consuming mixers. Such mixers can also be placed in other parts of the process to increase mixing and improve contact between compositions. In an alternative embodiment of the mixer pipe, the inner tube 802 can be slightly perforated to allow some movement of material between the inner pipe and the outer pipe. Specifically, it may be desirable to reduce gas content of the fluid in the inner pipe. The vortex motion of the outer fluid acts to cause a pressure differential between the inner and outer pipes which will aid in this process. Additionally, these mixer pipes are particularly suited for use in other parts of this process such as advanced oxidation process, ozone pretreatment, ozone disinfection, or other steps.

Ozone Destruction

In order to comply with federal regulations, excess ozone must be destroyed and cannot be released into the atmosphere. Thus, excess ozone from any of the process steps discussed herein can be destroyed using known technologies such as thermal and catalytic systems. In one embodiment, the present invention utilizes a heating element in conjunction with a manganese dioxide catalyst. Care should be taken to avoid allowing moisture into such a catalyst system as water will deactivate the catalyst.

Final Disinfection

Following the removal of ammonium, or other unwanted ions, by the zeolites described above, the water is sent to a final disinfection step 110. Ozone (O3), a powerful oxidizer, is used to remove or destroy any remaining pathogens, contaminants, odors, and color from the treated water. Although ozone has been used for centuries to treat water, the present invention employs a process to ensure maximum oxidation treatment power. In this final disinfection step, the water is sent through a pipe reactor containing static mixers under low pressure. The resulting mixture is supersaturated at these conditions and provides for an unexpected improvement in the oxidation process. In an alternative embodiment of this step of the present invention, air and ultraviolet light can be added to the water during the oxidation process.

The resulting treated water 111 is suitable for use in a variety of applications and is substantially free of high levels of contaminants. The treated water is typically ready for use as potable water or used as irrigation or make-up water in other processes. For example, mine wastewater from an EPA superfund site having high concentrations of metals was treated using the process of the present invention. Table 2 outlines the measured values (mg/l) of several metal contaminants from this mine wastewater as illustrative of some of the many contaminants which can be removed.

TABLE 2

|  | Arsenic | Cadmium | Lead | Zinc | Iron |
| --- | --- | --- | --- | --- | --- |
| Before Treatment | 7.22 | 0.284 | 0.011 | 34.2 | 120 |
| After Treatment | 0.002-0.015 | <0.001 | 0.002 | 0.03-0.18 | 0.03-0.06 |

Modular Nature of System

In a detailed aspect of the present invention, the above described processes and units are highly modular such that various changes can be made to accommodate a variety of waste-streams. Specifically, it is important to first assess the waste-stream to be treated for contaminant levels and types, i.e. high concentrations of metals, organics, etc. For example, a very different configuration may be necessary to treat a mine leachate stream having high levels of metals than would be required to treat a sewage waste-stream having high levels of organic and solid wastes. Once the waste-stream is characterized the appropriate configuration can be designed to most efficiently remove the identified contaminants. In one embodiment of the present invention, the process includes an initial prescreening filtration step followed by treatment using electrocoagulation. As described above the solids are sent to a solids filter and the remaining waste-stream is subjected to the advanced oxidation process (AOP). In another more detailed aspect, following the AOP step the water can be further filtered or polished using ozone disinfection. Waste-streams such as, but not limited to, those containing high levels of organics, sewage, landfill leachate, and the like are particularly suited to the use of the zeolite/ion-exchange columns. Likewise, a contaminated water source such as a low toxicity groundwater or other nearly potable water which merely need a final polishing process may only require the use of a simple filtration step and the ion-exchange and regeneration steps.

In one preferred embodiment of the present invention, the entire process as described above can be mounted on a trailer-truck bed. Such a portable configuration allows for quick startup and requires minimal space. Furthermore, remote waste-streams can be treated over short or long periods of time without the associated building costs of more permanent facilities. The volume of waste-stream influent which can be treated using such a trailer-truck configuration will vary considerably depending on the specific waste-stream properties, however highly contaminated streams have been treated at a rates of between 2 and 70 gpm. It should also be noted that several of the processes and units described above can be optimized for use in this compact and portable environment. For example, the spiral configuration of the pipe reactor shown in FIG. 5 not only reduces space but increases mixing at the elbows. Another example of such space saving techniques is the use of long cylindrical tanks for the brine solution which can be mounted along the sides of the truck bed.

In another more detailed aspect of the present invention, each unit can be configured as a modular unit such that upon review of the particular contaminated water stream a set of units can be delivered to a site for quick assembly by coupling the individual units. Modular units are substantially complete units that generally merely need to be connected to one another and/or a power source for operation. For example, individual units might include an initial filtration unit, electrocoagulation unit, advanced oxidation unit, solids filter unit, ion-exchange unit, and ozone production-destruction unit. One or more of each unit can be supplied depending on the desired capacity and the nature of the contaminated water.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A system comprising:
   an ion-exchange unit including an ion-exchange medium configured to remove cations from a waste stream;
   a brine source which is in fluid communication with the ion-exchange unit to deliver brine to the ion-exchange unit, the brine being configured to remove the cations from the ion-exchange medium and thereby produce a cation-containing brine;
   a reactor positioned to receive and treat the cation-containing brine;
   an electrophysical separation system positioned to receive and treat the cation-containing brine either before or after the cation-containing brine enters the reactor.

2. The system of claim 1, wherein the electrophysical separation system is positioned to receive the cation-containing brine before the cation-containing brine enters the reactor.

3. The system of claim 1, wherein the electrophysical separation system is positioned to receive the cation-containing brine after the cation-containing brine has been treated in the reactor.

4. The system of claim 1, wherein the reactor includes an oxidant and an oxidation catalyst.

5. The system of claim 4, wherein the reactor includes ozone.

6. The system of claim 1, wherein the ion-exchange medium includes zeolite.

7. The system of claim 1, wherein the cations include ammonium.

8. A method of removing cations from a waste stream comprising:
   passing a waste stream that includes cations through an ion-exchange medium;
   flushing the ion-exchange medium with a brine to remove the cations from the ion-exchange medium and thereby produce a cation-containing brine;
   treating the cation-containing brine using an electrophysical separation system; and
   reacting the cation-containing brine with an oxidant to produce a treated brine that is reused to flush the ion-exchange medium.

9. The method of claim 8, comprising reacting the cation-containing brine with an oxidant in the presence of an oxidation catalyst.

10. The method of claim 9, wherein the oxidant includes ozone.

11. The method of claim 8, wherein the oxidant includes ozone.

12. The method of claim 8, wherein the ion-exchange medium includes zeolite.

13. The method of claim 8, wherein the cations include ammonium.

14. The method of claim 8, wherein the reacting the cation-containing brine with the oxidant occurs subsequent to the treating the cation-containing brine using the electrophysical separation system.

* * * * *